US012062770B2

(12) United States Patent
Xiao et al.

(10) Patent No.: US 12,062,770 B2
(45) Date of Patent: Aug. 13, 2024

(54) THERMAL BARRIER COMPONENT FOR MITIGATING THERMAL RUNAWAY IN BATTERIES

(71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US); Wei Zeng, Oakland Township, MI (US); Aijie Chen, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 432 days.

(21) Appl. No.: 17/480,085

(22) Filed: Sep. 20, 2021

(65) Prior Publication Data
US 2023/0087017 A1    Mar. 23, 2023

(51) Int. Cl.
*H01M 10/658* (2014.01)
*H01M 50/293* (2021.01)

(52) U.S. Cl.
CPC ....... *H01M 10/658* (2015.04); *H01M 50/293* (2021.01)

(58) Field of Classification Search
CPC ............. H01M 10/658; H01M 50/293; H01M 10/4235; H01M 10/653; H01M 10/659;
(Continued)

(56) References Cited

U.S. PATENT DOCUMENTS 7,819,462 B1   10/2010   Owens
8,033,592 B2   10/2011   Hsu et al.
(Continued)

FOREIGN PATENT DOCUMENTS

CN   107986743 A      5/2018
CN   107986743 A  †  5/2018
(Continued)

OTHER PUBLICATIONS

Third Party Submission for German Patent Application No. 10 2022 120 229.1 entered Oct. 27, 2023, with correspondence from Manitz Finsterwald Patent- und Rechtsanwaltspartnerschaft mbB; 11 pages.
(Continued)

*Primary Examiner* — Stewart A Fraser
(74) *Attorney, Agent, or Firm* — Harness, Dickey & Pierce, P.L.C.

(57) ABSTRACT

A thermal barrier component for an electrochemical cell (e.g., a battery) includes a mat, a functional material, and a polymer binder. The mat includes a porous matrix. The functional material is in pores of the porous matrix. The functional material includes an oxide. In certain aspects, the functional material may be a composite material. The polymer binder is in contact with the porous matrix and the functional material. At least one of the porous matrix, the functional material, and the polymer binder is configured to serve as an intumescent carbon source. The oxide is configured to catalyze thermal degradation of the intumescent carbon source to form intumescent carbon at a first temperature. The first temperature is greater than or equal to about 300° C. The thermal barrier component is configured to mitigate thermal runaway in an electrochemical cell. The thermal barrier component may include one or more layers.

20 Claims, 9 Drawing Sheets

(58) Field of Classification Search
CPC ............. H01M 50/117; H01M 50/383; H01M 50/394; H01M 50/44
See application file for complete search history.

(56) References Cited

U.S. PATENT DOCUMENTS

| | | | |
|---|---|---|---|
| 10,665,913 | B2 | 5/2020 | Syed et al. |
| 10,749,146 | B2 | 8/2020 | Berger et al. |
| 11,721,860 | B2 | 8/2023 | Xiao et al. |
| 2006/0106147 | A1 | 5/2006 | Fasulo et al. |
| 2006/0199890 | A1 | 9/2006 | Fasulo et al. |
| 2007/0299185 | A1 | 12/2007 | Ottaviani et al. |
| 2010/0098925 | A1 | 4/2010 | Fasulo et al. |
| 2011/0121225 | A1 | 5/2011 | Posudievsky et al. |
| 2016/0223269 | A1* | 8/2016 | Hartmann ............... B32B 27/00 |
| 2020/0377690 | A1† | 12/2020 | Ootsuki |
| 2021/0163303 | A1 | 6/2021 | Evans et al. |
| 2022/0158273 | A1* | 5/2022 | Khateeb Razack ........................ H01M 10/617 |
| 2023/0059036 | A1 | 2/2023 | Xiao et al. |
| 2023/0087207 | A1 | 3/2023 | Xiao et al. |

FOREIGN PATENT DOCUMENTS

| | | | |
|---|---|---|---|
| CN | 115832509 | A | 3/2023 |
| CN | 115939614 | A | 4/2023 |
| DE | 102019121849 | A1 | 2/2021 |
| DE | 102021118395 | A1 | 1/2023 |
| DE | 102020005871 | U1 | 2/2023 |
| DE | 102022120229 | A1 | 3/2023 |
| EP | 2755261 | B1 | 12/2018 |
| KR | 20160108987 | A † | 9/2016 |
| KR | 1020160108987 | A | 9/2016 |
| WO | WO-2019059198 | A1 | 3/2019 |
| WO | WO-2019163839 | A1 | 8/2019 |

OTHER PUBLICATIONS

First Office Action for German Patent Application No. 102022120234.8 issued on Mar. 16, 2023, with correspondence from Manitz Finsterwald Patent- und Rechtsanwaltspartnerschaft mbB summarizing Office Action; 6 pages.

Third Party Submission to U.S. Patent & Trademark Office Under 37 CFR 1.290 for U.S. Appl. No. 17/480,085 entered Nov. 15, 2023; 25 pages.

Bourbigot et al; "Zeolites: New Synergistic Agents for Intumescent Fire Retardant Thermoplastic Formulations—Criteria for the Choice of the Zeolite"; Fire and Materials, vol. 20, pp. 145-154 (1996).

Xiao et al; "Flame-Retardant Compositions for Energy Storage Devices, Methods of Manufacture Thereof and Batteries Containing the Same," U.S. Appl. No. 17/396,208, filed Aug. 6, 2021.

\* cited by examiner
† cited by third party

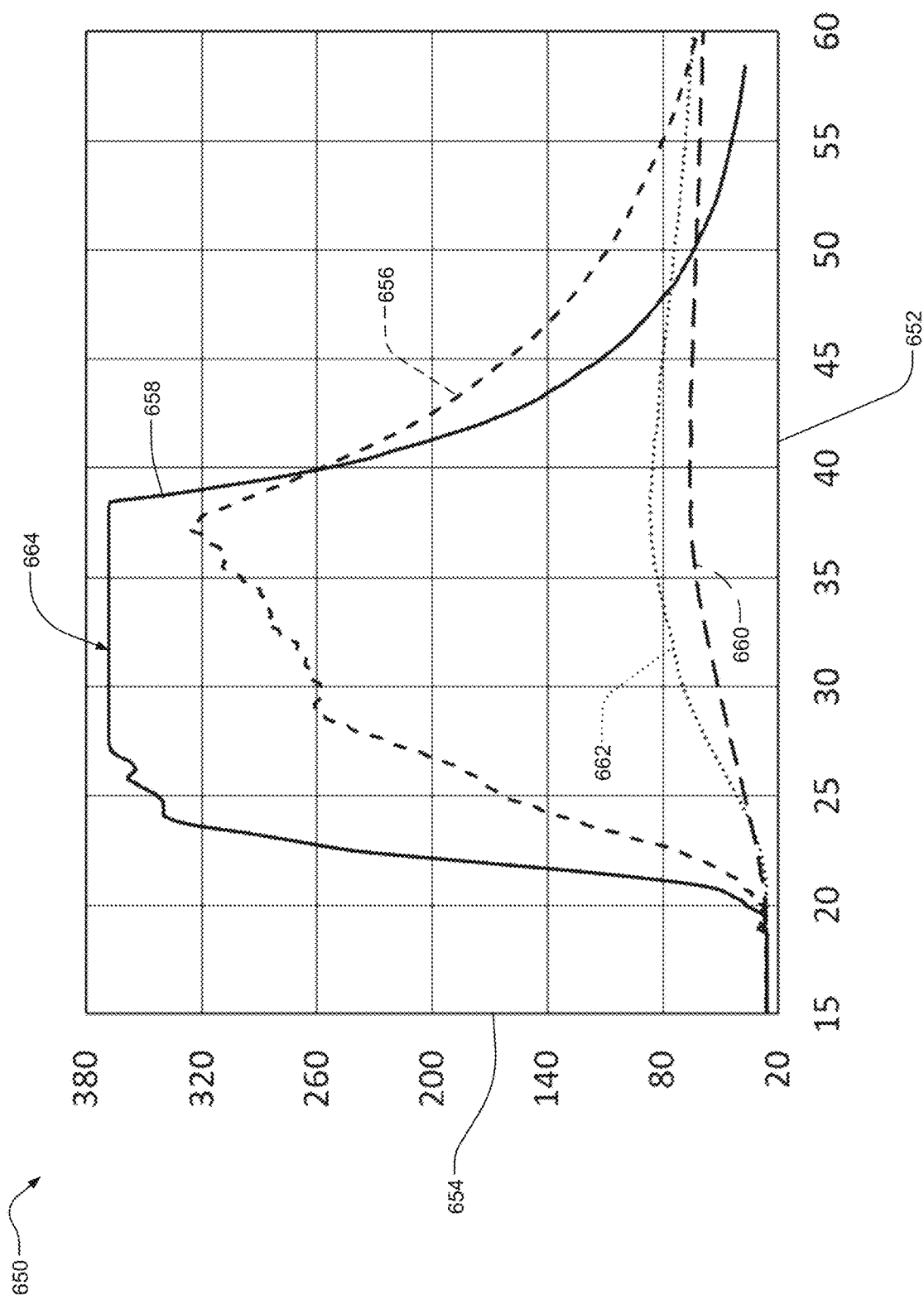

THERMAL BARRIER COMPONENT FOR MITIGATING THERMAL RUNAWAY IN BATTERIES

INTRODUCTION

This section provides background information related to the present disclosure which is not necessarily prior art.

The present disclosure relates to thermal barrier components and thermal barrier assemblies for electrochemical cells/batteries to reduce or minimize thermal runaway propagation events. The present disclosure also relates to battery packs including the thermal barrier components and/or assemblies.

Advanced energy storage devices and systems are in demand to satisfy energy and/or power requirements for a variety of products, including automotive products such as start-stop systems (e.g., 12V start-stop systems), battery assisted systems, hybrid electric vehicles ("HEVs"), and electric vehicles ("EVs"). Lithium-ion electrochemical or batteries typically comprise a plurality of cells that may be electrically connected in a stack to increase overall output. In particular, the battery cells may include alternating positive electrodes and negative electrodes with separators disposed there between to define a stack. These battery cells thus form battery modules. The modules may be assembled into a battery pack that is disposed in an encasement or battery housing or cover.

SUMMARY

This section provides a general summary of the disclosure, and is not a comprehensive disclosure of its full scope or all of its features.

In various aspects, the present disclosure provides a thermal barrier component for an electrochemical cell. The thermal barrier component includes a mat, a functional material, and a polymer binder. The mat includes a porous matrix. The functional material is in pores of the porous matrix. The functional material includes an oxide. The polymer binder is in contact with the porous matrix and the functional material. At least one of the porous matrix, the functional material, and the polymer binder is configured to serve as an intumescent carbon source. The oxide is configured to catalyze thermal degradation of the intumescent carbon source to form intumescent carbon at a first temperature. The first temperature is greater than or equal to about 300° C.

In one aspect, the functional material further includes a phase change material.

In one aspect, the phase change material includes at least one of a solid-solid phase change material and a solid-liquid phase change material. The solid-solid phase change material is selected from the group consisting of: pentaerythritol, pentaglycerine, neopentyl-glycol, high-density polyethylene, a layered porovskite, or any combination thereof. The solid-liquid phase change material is selected from the group consisting of: sodium sulfate decahydrate, calcium chloride hexahydrate, magnesium chloride hexahydrate, calcium chloride-calcium bromide hexahydrate, magnesium nitrate hexahydrate, magnesium chloride-magnesium nitrate hexahydrate, or any combination thereof. The phase change material is present in the thermal barrier component in an amount ranging from about 20 weight percent to about 40 weight percent.

In one aspect, the phase change material is configured to serve as the intumescent carbon source.

In one aspect, the phase change material is configured to undergo endothermic phase change at a second temperature. The second temperature is greater than or equal to about 100° C. to less than or equal to about 250° C.

In one aspect, the porous matrix includes glass fibers, carbon fibers, or a polymer foam.

In one aspect, the porous matrix includes the polymer foam. The polymer foam is configured to serve as the intumescent carbon source.

In one aspect, the intumescent carbon source includes polyurethane.

In one aspect, the porous matrix defines a porosity of greater than or equal to about 90%.

In one aspect, the functional material further includes a fire retardant.

In one aspect, the functional material includes a plurality of particles including the oxide. At least a portion of the fire retardant is adsorbed on at least a portion of the plurality of particles.

In one aspect, the oxide is configured to release the fire retardant at a second temperature. The second temperature is greater than or equal to about 300° C. to less than or equal to about 900° C.

In one aspect, the fire retardant is selected from the group consisting of: a phosphate-based fire retardant, a carbonate-based fire retardant, a nitrate-based fire retardant, or any combination thereof. The fire retardant is present in the thermal barrier component in an amount greater than or equal to about 5 weight percent to less than or equal to about 25 weight percent.

In one aspect, the functional material includes a zeolite. The zeolite includes the oxide.

In one aspect, the oxide is selected from the group consisting of: $SiO_2$, $Al_2O_3$, $ZrO_2$, $TiO_2$, $CaO$, $V_2O_5$, $MgO$, or any combination thereof.

In one aspect, the oxide is present in the thermal barrier component an amount ranging from about 10 weight percent to about 30 weight percent.

In one aspect, the functional material includes, a plurality of particles including the oxide and
water adsorbed on the plurality of particles. The water is configured to be released from the plurality of particles at a second temperature. The second temperature is greater than or equal to about 100° C.

In one aspect, the intumescent carbon source is present in the thermal barrier component in an amount greater than or equal to about 10 weight percent to less than or equal to about 30 weight percent.

In one aspect, the mat defines a compressibility of greater than or equal to about 10%.

In various aspects, the present disclosure provides a thermal barrier component for an electrochemical cell. The thermal barrier component includes a mat and a functional material. The mat includes a porous matrix. The functional material includes a plurality of particles, water, a fire retardant, and a phase change material. The functional material is in pores of the porous matrix. The plurality of particles include a zeolite. The water is adsorbed on the plurality of particles. The water is configured to be released from the plurality of particles at a first temperature of greater than or equal to about 100° C. The fire retardant is adsorbed on the plurality of particle. The fire retardant is configured to be released from the plurality of particles at a second temperature greater than or equal to about 300° C. to less than or equal to about 900° C. The phase change material is configured to undergo endothermic phase change at a third temperature of greater than or equal to about 100° C. to less than or equal to about 250° C.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 3A is a scanning electron microscope ("SEM") image of a fiber glass matrix; FIG. 3B is a photograph showing a plurality of different mats prior to heating; and FIG. 3C is a SEM image of the fiber glass matrix of FIG. 3A, coated with recrystallized phase change material after heating and cooling;

FIG. 4A is a photograph or a bare polyurethane mat; FIG. 4B is a photograph of the mat of FIG. 4A having functional materials cast thereon; FIG. 4C is a photograph of a front of a polyurethane mat attached to an aluminum plate; FIG. 4D is a photograph of a back of the polyurethane mat of FIG. 4C; FIG. 4E is a photograph of the front of the polyurethane mat and aluminum plate of FIG. 4C having functional materials cast thereon; and FIG. 4F is a photograph of a thermal barrier assembly including the polyurethane mat, aluminum sheet, and functional materials of FIG. 4E;

FIG. 5A is a photograph of the four thermal barrier components on a heater plate; and FIG. 5B is a graph illustrating temperature as a function of time for the heater plate and the fourth thermal barrier components of FIG. 5A;

FIGS. 6A-6C relate to an example of simulating thermal runaway in four different thermal barrier components according to various aspects of the present disclosure; FIG. 6A is a photograph of the four thermal barrier components; FIG. 6B is a schematic of an experimental setup; and FIG. 6C is a graph illustrating temperature as a function of time for the four thermal barrier components of FIG. 6A;

FIG. 7A is a photograph of the thermal barrier component; and FIG. 7B is a graph illustrating internal temperature of a foam sheet of the thermal barrier component of FIG. 7A as a function of time.

Corresponding reference numerals indicate corresponding parts throughout the several views of the drawings.

DETAILED DESCRIPTION

Figure 1:
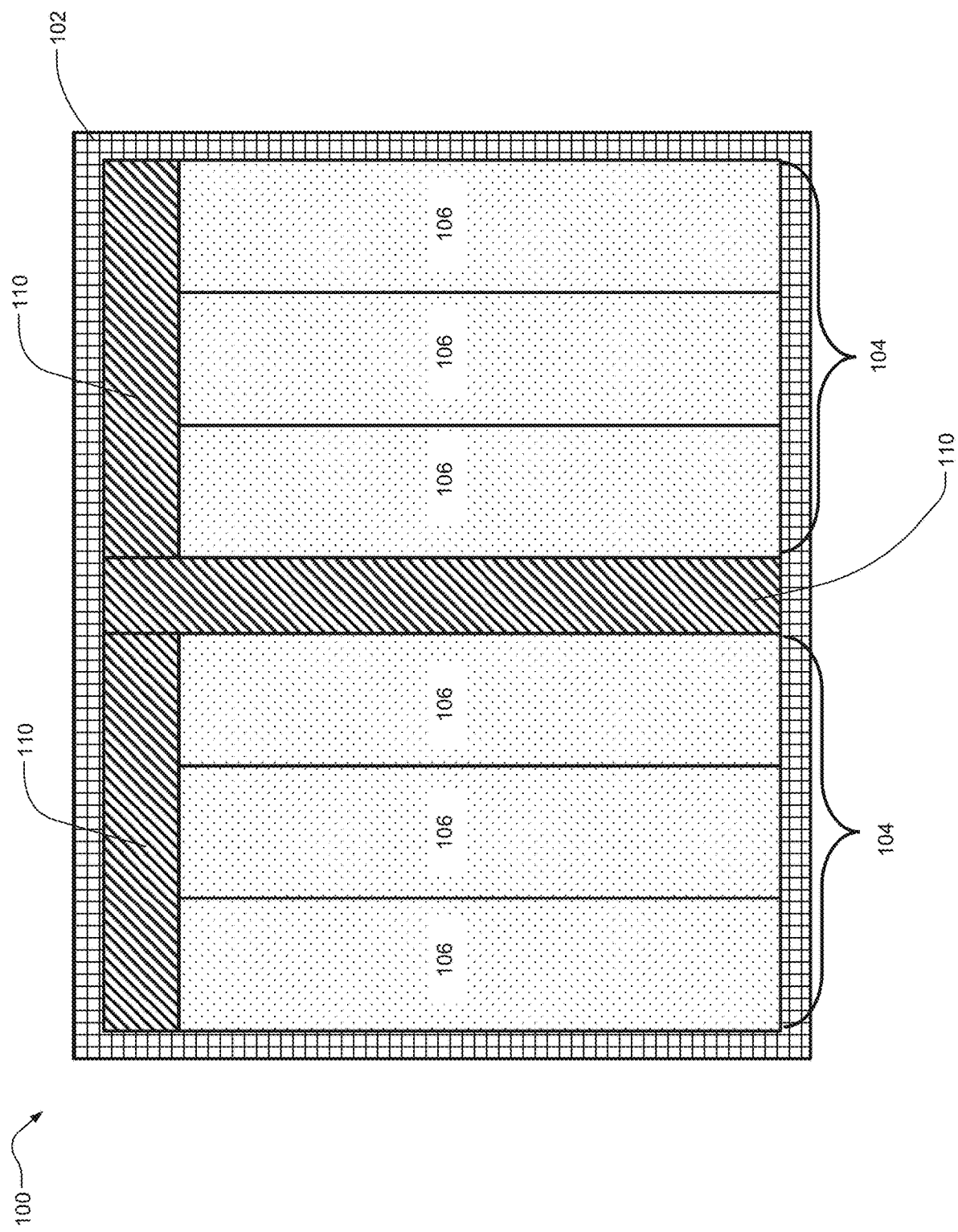
FIG. 1 is a schematic illustration of a battery pack including a thermal barrier component according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides a thermal barrier component for reducing or minimizing thermal runaway propagation ("TRP"). The thermal barrier component includes a sheet or mat including a porous matrix and a functional material in the porous matrix. The thermal barrier component may further include a binder. The functional material includes an oxide (e.g., a zeolite). The functional material may further include a fire retardant, a phase change material, and/or water.

In certain aspects, the thermal barrier component may be configured to absorb heat, reduce heat transfer, and/or otherwise mitigate thermal runaway in a plurality of stages associated with different temperature ranges. For example, the functional material may include water that is configured to be released at a first temperature, a phase change material that is configured to undergo endothermic phase change at a second temperature greater than the first temperature, and a fire retardant that is configured to be released at a third temperature greater than the second temperature.

In certain aspects, at least one of the porous matrix, the functional material, and the polymer binder includes or serves as an intumescent carbon source. The oxide and the intumescent carbon source have a synergistic relationship such that the oxide facilitates or catalyzes the formation of intumescent carbon (e.g., carbon char). Carbon char may mitigate thermal runaway by slowing down thermal transfer due to its highly porous microstructure. The intumescent carbon source may thermally decompose at a fourth temperature to form carbon char. The fourth temperature may be greater than the second temperature.

In certain aspects, the thermal barrier component may be configured to increase a duration of time after a thermal event to reach a triggering temperature at which uncontrolled chemical reactions may begin, leading to thermal runaway. The triggering temperature may be about 200° C. The thermal barrier component may also be configured to suppress conflagration after thermal runaway.

With reference to FIG. 1, a battery pack 100 according to various aspects of the present disclosure is provided. The battery back 100 includes a housing or pouch 102. The battery pack 100 further includes one or more battery modules 104. Each of the battery modules 104 generally includes a plurality of battery cells 106 (that may be provided in subassemblies of stacks or blocks) that may be disposed in a frame or other structure in each battery module 104 for protection from external forces or heat. Any number of the cells, blocks and/or battery modules may be selected and connected to a positive or negative source terminal. The cells, blocks and battery modules may be connected in series and/or in parallel; in different connected configurations; and may be organized into blocks, packs, and/or groups. The battery cells 106 and module(s) 104 may be connected and controlled via a battery management system ("BMS"—not shown) that can help to control and manage various aspects of the battery operation, including power output, voltage, current, temperature, SOX, and the like. The housing 102 thus can encase battery pack 102 thus includes one or more battery modules 104, the BMS, and optionally a cooling system (not shown). These are contained an interior compartment of the housing 102 along with any other electrical conduits or conventional components, such as bus bars, circuitry, and portions of terminals for external connection to a load and power source.

The battery pack 100 further includes one or more thermal barrier components 110. The thermal barrier components 110 may be disposed between adjacent battery modules 104 and/or between battery modules 104 and the housing 102 (e.g., above battery modules 104, as shown, below battery modules 104, and/or along sides of battery modules 104). The thermal barrier components 110 may be configured to reduce or minimize TRP, which may be an uncontrolled high temperature thermal event, including a conflagration or fire. As referred to herein, such a TRP event may be caused by a thermal load that is excessive and beyond the range of normal operational temperatures. By way of example, a TRP may result if a short circuit arises within the battery. For example, a source of heat or flame in a thermal runaway propagation event may exceed temperatures of about 500° C., optionally about 600° C., optionally about 700° C., optionally about 800° C., optionally about 900° C. optionally about 1,000° C., optionally about 1,100° C., and optionally may exceed about 1,200° C. The source of heat or flame may originate in the interior compartment of the battery housing or module. In certain aspects, the battery pack 100 is free of an active fire extinguisher.

In various aspects, the thermal barrier component 110 includes a porous matrix, a functional material, and optionally a binder. The binder may be in contact with both the porous matrix and the functional material. The functional material and the binder may be impregnated or disposed in pores of the porous matrix. In certain aspects, interior surface(s) of the porous matrix are at least partially coated by the functional material and binder. The functional material may include one or more of a synergistic reaction agent (e.g., an oxide), a phase change material, and a fire retardant, as described in greater detail below. In certain aspects, the functional material may be a composite material. In certain aspects, at least one of the porous matrix, the functional material, and the binder includes or serves as an intumescent carbon source (such as at elevated temperatures), as described in greater detail below.

In certain aspects, the porous matrix may include glass fibers, carbon fibers, a polymer foam, or any combination thereof. The polymer foam may be or include the intumescent carbon source. For example, the polymer foam may include polyurethane foam.

In certain aspects, the porous matrix may have a porosity of greater than or equal to about 50%, optionally greater than or equal to about 55%, optionally greater than or equal to about 60%, optionally greater than or equal to about 65%, optionally greater than or equal to about 70%, optionally greater than or equal to about 75%, optionally greater than or equal to about 80%, optionally greater than or equal to about 85%, or optionally greater than or equal to about 90%, by way of example. The porosity may be less than or equal to about 95%, optionally less than or equal to about 90%, optionally less than or equal to about 90%, or optionally less than or equal to about 90%, by way of example. The porous matrix may define voids or pores having an average size of greater than or equal to about 500 nm, optionally greater than or equal to about 1 µm, optionally greater than or equal to about 10 µm, optionally greater than or equal to about 50 µm, optionally greater than or equal to about 100 µm, optionally greater than or equal to about 250 µm, optionally greater than or equal to about 400 µm. The average size may be less than or equal to about 500 µm, optionally less than or equal to about 400 µm, optionally less than or equal to about 250 µm, optionally less than or equal to about 100 µm, optionally less than or equal to about 50 µm, optionally less than or equal to about 10 µm, or optionally less than or equal to about 5 µm, optionally less than or equal to about 1 µm.

As noted above, the functional material and binder may at least partially coat the porous matrix and/or infiltrate pores or voids of the porous matrix. In certain aspects, the functional material and binder do not occupy 100% of the void space of the porous matrix. For example, the thermal barrier component 110 may define a porosity of greater than or equal to about 20%, optionally greater than or equal to about 25%, optionally greater than or equal to about 30%, optionally greater than or equal to about 35%, optionally greater than or equal to about 40%, optionally greater than or equal to about 45%, optionally greater than or equal to about 50%, optionally greater than or equal to about 55%, or optionally greater than or equal to about 60%. The thermal barrier component may define a porosity of less than or equal to about 80%, optionally less than or equal to about 70%, optionally less than or equal to about 65%, optionally less than or equal to about 60%, optionally less than or equal to about 55%, or optionally less than or equal to about 50%.

Figure 2:
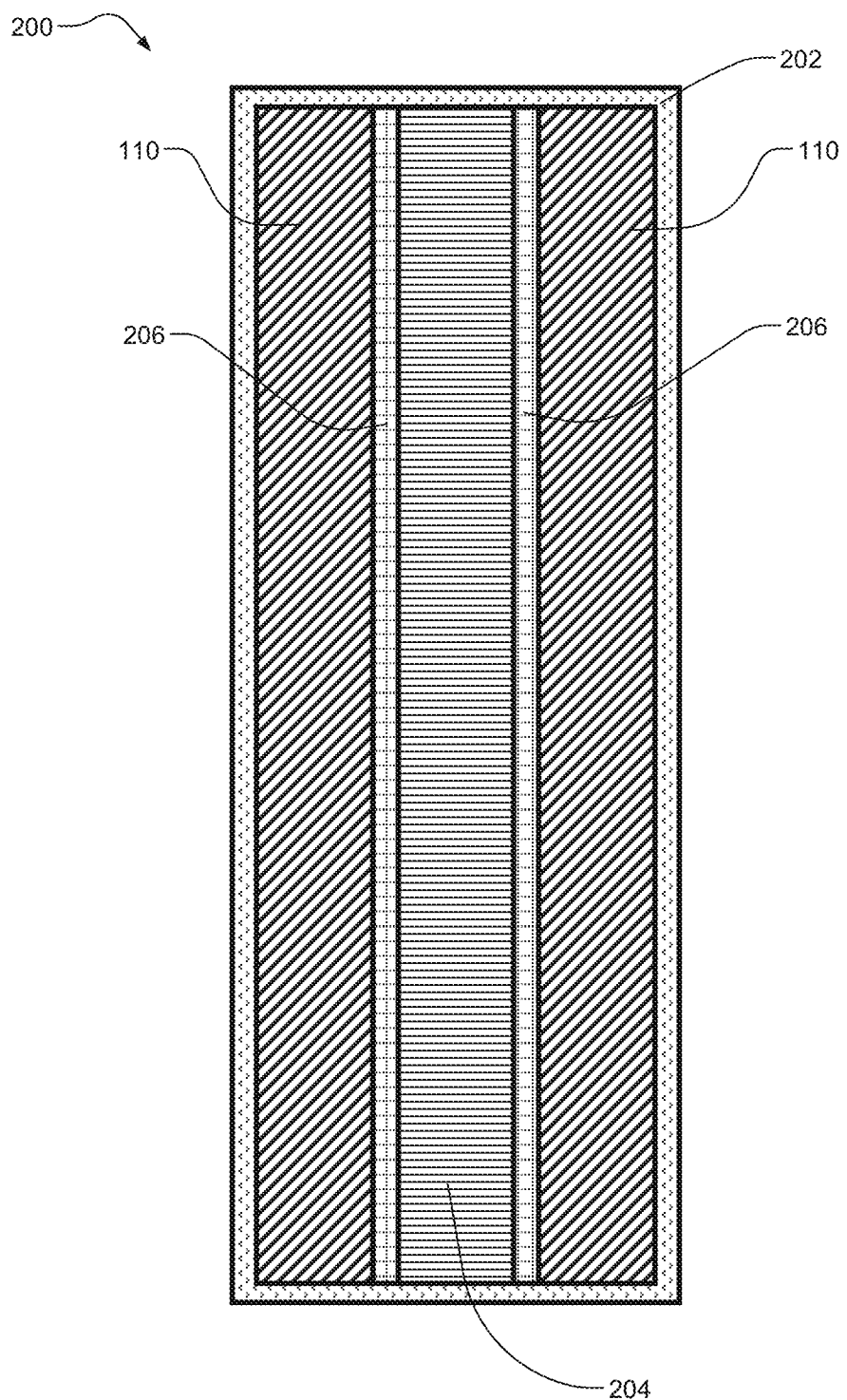
FIG. 2 is a schematic illustration of a thermal barrier assembly including the thermal barrier component of FIG. 1 according to various aspects of the present disclosure.

In certain aspects, the porous matrix is in a form of a mat or sheet. The mat or sheet may be freestanding and/or coupled to one or more other components (FIG. 2). In certain aspects, the mat may have substantially the same height and width as the battery cells 106, such as when it is disposed adjacent to at least one of the battery cells. The mat may have a desired mechanical strength while being flexible enough to accommodate thickness changes in battery cells 106. In certain aspects, the mat may have a compressibility of greater than or equal to about 5%, optionally greater than or equal to about 10%, optionally greater than or equal to about 15%, optionally greater than or equal to about 20%, or optionally greater than or equal to about 25%. The compressibility may be less than or equal to about 30%, optionally less than or equal to about 25%, optionally less than or equal to about 20%, optionally less than or equal to about 15%, or optionally less than or equal to about 10%. The mat may define a thickness of greater than or equal to about 100 µm, optionally greater than or equal to about 500 µm, optionally greater than or equal to about 1 mm, optionally greater than or equal to about 2 mm, optionally greater than or equal to about 3 mm, optionally greater than or equal to about 4 mm, optionally greater than or equal to about 5 mm, optionally greater than or equal to about 6 mm, optionally greater than or equal to about 1 cm. The thickness may be less than or equal to about 2 cm, optionally less than or equal to about 1.5 cm, optionally less than or equal to about 1 cm, optionally less than or equal to about 8 mm, optionally less than or equal to about 5 mm, or optionally less than or equal to about 1 mm. In certain aspects, the thickness is greater than or equal to about 1 mm to less than or equal to about 5 mm.

In certain aspects, the porous matrix may be present in the thermal barrier component 110 an amount greater than or equal to about 5 weight percent, optionally greater than or equal to about 10 weight percent, optionally greater than or equal to about 15 weight percent, optionally greater than or equal to about 20 weight percent, or optionally greater than or equal to about 20 weight percent. The porous matrix may be present in the thermal barrier component an amount less than or equal to about 30 weight percent, optionally less than or equal to about 25 weight percent, optionally less than or equal to about 20 weight percent, optionally less than or equal to about 15 weight percent, or optionally less than or equal to about 10 weight percent. In certain aspects, the porous matrix may be present in the thermal barrier component in an amount greater than or equal to about 5 weight percent to less than or equal to about 25 weight percent, optionally greater than or equal to about 10 weight percent to less than or equal to about 20 weight percent, or optionally about 15 weight percent.

As described above, the functional material may include a synergistic reaction agent. In certain aspects, the synergistic reaction agent is configured to catalyze or facilitate formation of intumescent carbon (e.g., carbon char) from the intumescent carbon source. The synergistic reaction agent may be thermally-insulating. In certain aspects, the synergistic reaction agent may itself have intumescent properties.

The synergistic reaction agent may include an oxide. The oxide may include $SiO_2$, $Al_2O_3$, $ZrO_2$, $TiO_2$, $CaO$, $V_2O_5$, $MgO$, or any combination thereof. In certain aspects, the synergistic reaction agent includes a zeolite. The zeolite may have the chemical formula $M_{x/n}[(AlO_2)_x(SiO_2)_y]zH_2O$, $M^{n+}$ being a balance cation. The ratio y/x may be greater than or equal to about 1. In certain aspects, the y/x ratio may be less than or equal to about 20. In certain aspects, a Examples of suitable zeolites are described in Serge Bourbigot, Michel Le Bras, Patrice Bréant, Jean-Michel Trémillon, & René Delobel, *Zeolites: New Synergistic Agents for Intumescent Fire Retardant Thermoplastic Formulations—Criteria for the Choice of Zeolite,* 20 FIRE & MATERIALS 145-54 (1996), incorporated herein by reference in its entirety.

In certain aspects, the synergistic reaction agent may be present in the thermal barrier component 110 an amount greater than or equal to about 5 weight percent, optionally greater than or equal to about 10 weight percent, optionally greater than or equal to about 15 weight percent, optionally greater than or equal to about 20 weight percent, optionally greater than or equal to about 25 weight percent, or optionally greater than or equal to about 30 weight percent. The synergistic reaction agent may be present in the thermal barrier component an amount less than or equal to about 35 weight percent, optionally less than or equal to about 30 weight percent, optionally less than or equal to about 25 weight percent, optionally less than or equal to about 20 weight percent, optionally less than or equal to about 15 weight percent, or optionally less than or equal to about 10 weight percent. In certain aspects, the synergistic reaction agent may be present in the thermal barrier component in an amount greater than or equal to about 10 weight percent to less than or equal to about 30 weight percent, greater than or equal to about 15 weight percent to less than or equal to about 25 weight percent, or optionally about 20 weight percent.

In certain aspects, the functional material includes a plurality of particles formed from or including the synergistic reaction agent. The plurality of particles may be porous. The plurality of particles may further include adsorbed water and/or fire retardant. In one example, the plurality of particles include a zeolite powder having water and fire retardant adsorbed thereon. The particles may have any size that fits within the pores of the porous matrix. In some examples, the particles have an average size of greater than or equal to about 50 nm to less than or equal to about 500 μm.

In certain aspects, the functional material may contain water. The water may be adsorbed on the synergistic reaction agent (e.g., zeolite). The water may be present in an amount greater than or equal to about 1 weight percent, optionally greater than or equal to about 1 weight percent, optionally greater than or equal to about 1 weight percent, optionally greater than or equal to about 1 weight percent, optionally greater than or equal to about 1 weight percent, or optionally greater than or equal to about 1 weight percent. The water may be present in an amount less than or equal to about 30 weight percent, less than or equal to about 25 weight percent, optionally less than or equal to about 20 weight percent, optionally less than or equal to about 15 weight percent, optionally less than or equal to about 10 weight percent, or optionally less than or equal to about 5 weight percent.

In certain aspects, the water may be configured to be release from the thermal barrier component 110 (e.g., desorbed from the synergistic reaction agent, vaporized) at a first temperature. The first temperature may be greater than or equal to about 80° C., optionally greater than or equal to about 85° C., optionally greater than or equal to about 90° C., optionally greater than or equal to about 95° C., optionally greater than or equal to about 100° C., optionally greater than or equal to about 105° C., or optionally greater than or equal to about 110° C.

In certain aspects, the functional material may further include a phase change material ("PCM"). The PCM may be a polymer-based PCM. The polymer-based PCM may include carbon. In certain aspects, the PCM has a high latent heat absorption, such as greater than or equal to about 120 kJ/kg, optionally greater than or equal to about 150 kJ/kg, optionally greater than or equal to about 175 kJ/kg, optionally greater than or equal to about 200 kJ/kg, optionally greater than or equal to about 250 kJ/kg, or optionally greater than or equal to about 300 kJ/kg.

In certain aspects, the PCM may be configured to undergo endothermic phase change at a second temperature of greater than or equal to about 0° C., greater than or equal to about 75° C., optionally greater than or equal about 100° C., optionally greater than or equal about 125° C., optionally greater than or equal about 150° C., optionally greater than or equal about 175° C., optionally greater than or equal about 200° C., or optionally greater than or equal about 225° C. In certain aspects, second temperature is less than or equal to about 250° C., optionally less than or equal to about 225° C., optionally less than or equal to about 200° C., optionally less than or equal to about 175° C., optionally less than or equal to about 150° C., or optionally less than or equal to about 125° C. In an example, the second temperature is greater than or equal to about 100° C. to less than or equal to about 250° C.

The PCM may be a solid-solid PCM or a solid-liquid PCM. In certain aspects, the solid-solid PCM includes pentaerythritol (PE), pentaglycerine (PG), neopentyl-glycol (NPG), high-density polyethylene (HDPE) (e.g., form-stable HDPE), a layered porovskite, or any combination thereof. In an example, the solid-solid PCM includes PE. In another example, the solid-solid PCM may include a solid solution mixture of NPG and PG (e.g., 60 wt % NPG/40 wt % PG). In certain aspects, the solid-liquid PCM includes sodium sulfate decahydrate, calcium chloride hexahydrate, magnesium chloride hexahydrate, calcium chloride-calcium bromide hexahydrate, magnesium nitrate hexahydrate, magnesium chloride-magnesium nitrate hexahydrate, or any combination thereof. In certain aspects, the PCM may include the intumescent carbon source (e.g., PE).

In certain aspects, the PCM may be present in the thermal barrier component 110 an amount greater than or equal to about 15 weight percent, optionally greater than or equal to about 20 weight percent, optionally greater than or equal to about 25 weight percent, optionally greater than or equal to about 30 weight percent, optionally greater than or equal to about 35 weight percent, or optionally greater than or equal to about 40 weight percent. The PCM may be present in the thermal barrier component an amount less than or equal to about 45 weight percent, optionally less than or equal to about 40 weight percent, optionally less than or equal to about 35 weight percent, optionally less than or equal to about 30 weight percent, optionally less than or equal to about 25 weight percent, or optionally less than or equal to about 20 weight percent. In certain aspects, the PCM may be present in the thermal barrier component in an amount greater than or equal to about 20 weight percent to less than or equal to about 40 weight percent, greater than or equal to about 25 weight percent to less than or equal to about 35 weight percent, or optionally about 30 weight percent.

In certain aspects, the thermal barrier component further includes a fire retardant (FR). The FR may be configured to react with flammable gases, such as from a thermally-decomposing electrolyte, to suppress or terminate combustion chain branch reactions. In certain aspects, the FR is adsorbed on a plurality of particles, such as the plurality of particles including the oxide, described above.

The FR may be released, such as by decomposition, or desorbed at a third temperature of greater than or equal to about 200° C., optionally greater than or equal to about 250° C., greater than or equal to about 300° C., greater than or equal to about 350° C., greater than or equal to about 400° C., greater than or equal to about 450° C., greater than or equal to about 500° C., greater than or equal to about 550° C., greater than or equal to about 600° C., greater than or equal to about 650° C., greater than or equal to about 700° C., greater than or equal to about 750° C., greater than or equal to about 800° C., greater than or equal to about 850° C. The third temperature may be less than or equal to about 900° C., optionally less than or equal to about 850° C., optionally less than or equal to about 800° C., optionally less than or equal to about 750° C., optionally less than or equal to about 700° C., optionally less than or equal to about 650° C., optionally less than or equal to about 600° C., optionally less than or equal to about 550° C., optionally less than or equal to about 500° C., optionally less than or equal to about 450° C., optionally less than or equal to about 400° C., or optionally less than or equal to about 350° C.

The FR may include an acid agent for intumescent formation. In certain aspects, the FR includes a phosphate-based fire retardant (e.g., $(NH_4)_3PO_4$), a carbonate-based fire retardant (e.g., $MgCO_3$, $Mg_3Ca(CO_3)_4$, $K_2CO_3$, $Na_2CO_3$), a nitrate-based fire retardant (e.g., $NaNO_3$), a hydroxide-based FR (e.g., $Al(OH)_3$, $Mg(OH)_2$), a chloride-based FR (e.g., KCl, NaCl), any other suitable FR, or any combination thereof. In certain aspects, the FR includes $(NH_4)_3PO_4$, $Al(OH)_3$, $Mg(OH)_2$, hydromagnesite $(Mg_5(CO_3)_4(OH)_2 \cdot 4H_2O)$, $Mg_3Ca(CO_3)_4$, $MgCO_3$, $NaNO_3$, $K_2CO_3$, $Na_2CO_3$, KCl, NaCl, or any combination thereof.

In certain aspects, the FR may be present in the thermal barrier component 110 an amount greater than 0 weight percent, optionally greater than or equal to about 5 weight percent, optionally greater than or equal to about 10 weight percent, optionally greater than or equal to about 15 weight percent, optionally greater than or equal to about 20 weight percent, or optionally greater than or equal to about 20 weight percent. The FR may be present in the thermal barrier component an amount less than or equal to about 30 weight percent, optionally less than or equal to about 25 weight percent, optionally less than or equal to about 20 weight percent, optionally less than or equal to about 15 weight percent, optionally less than or equal to about 10 weight percent, or optionally less than or equal to about 5 weight percent. In certain aspects, the FR may be present in the thermal barrier component in an amount greater than or equal to about 5 weight percent to less than or equal to about 25 weight percent, greater than or equal to about 10 weight percent to less than or equal to about 20 weight percent, or optionally about 15 weight percent.

In certain aspects, the thermal barrier component 110 includes a binder. The binder may be a polymeric binder. The binder may be an aqueous polymeric binder. In certain other aspects, the thermal barrier component 110 may be free of a binder. In certain aspects, a portion of water from the aqueous binder may be adsorbed in the synergistic reaction agent and remain in the thermal barrier component.

In certain aspects, the binder may include a cellulose polymer binder, epoxy, polyester, phenolic resins, starches, sucrose, lactose, or any combination thereof.

In certain aspects, the binder may be present in the thermal barrier component 110 in an amount greater than or equal to about 5 weight percent, optionally greater than or equal to about 10 weight percent, optionally greater than or equal to about 15 weight percent, optionally greater than or equal to about 20 weight percent, optionally greater than or equal to about 25 weight percent, or optionally greater than or equal to about 30 weight percent. The binder may be present in the thermal barrier component an amount less than or equal to about 35 weight percent, optionally less than or equal to about 30 weight percent, optionally less than or equal to about 25 weight percent, optionally less than or equal to about 20 weight percent, optionally less than or equal to about 15 weight percent, or optionally less than or equal to about 10 weight percent. In certain aspects, the binder agent may be present in the thermal barrier component in an amount greater than or equal to about 10 weight percent to less than or equal to about 30 weight percent, greater than or equal to about 15 weight percent to less than or equal to about 25 weight percent, or optionally about 20 weight percent.

In certain aspects, the thermal barrier component 110 includes or serves as an intumescent carbon source. An intumescent carbon source is a material that is capable of thermally decomposing to produce intumescent carbon at elevated temperatures. The intumescent carbon source may be present in at least one of the porous matrix (e.g., polyurethane foam), the functional material (e.g., a polymer-based PCM), or the binder (e.g., a carbon-based polymer binder). The thermal barrier component 110 may include more than one intumescent carbon source.

The intumescent carbon source may be configured to thermally degrade into intumescent carbon. Thermal degradation may be catalyzed by the synergistic reaction agent (e.g., a zeolite). The intumescent carbon may be or include carbon char. The intumescent carbon may be configured to reduce or prevent heat transfer under fire. In certain aspects, the intumescent carbon source is configured to thermally degrade at a fourth temperature of greater than or equal to about 300° C., optionally greater than or equal to about 350° C., optionally greater than or equal to about 400° C., optionally greater than or equal to about 450° C., optionally greater than or equal to about 500° C., optionally greater than or equal to about 550° C., optionally greater than or equal to about 600° C., optionally greater than or equal to about 650° C., optionally greater than or equal to about 700° C., or optionally greater than or equal to about 750° C. The fourth temperature may be less than or equal to about 800° C., optionally less than or equal to about 750° C., optionally less than or equal to about 700° C., optionally less than or equal to about 650° C., optionally less than or equal to about 600° C., optionally less than or equal to about 550° C., optionally less than or equal to about 500° C., optionally less than or equal to about 450° C., optionally less than or equal to about 400° C., or optionally less than or equal to about 350° C. In certain aspects, the fourth temperature may be greater than or equal to about 300° C. to less than or equal to about 900° C.

The thermal barrier component 110 may be configured to slow temperature increase to reduce or prevent TRP, prevent fire, and/or reduce or prevent spread of fire. In certain aspects, the thermal barrier component 110 is configured to provide different functions at different temperature stages. For example, the thermal barrier component 110 may be configured to release water at the first temperature or within a first temperature range, undergo endothermic phase transfer of the PCM at the second temperature or within a second temperature range, release FR at the third temperature or within a third temperature range, and form intumescent carbon at the fourth temperature or within a fourth temperature range. In certain aspects, the second temperature may be greater than the first temperature and less than the third temperature and the fourth temperature. The third temperature may be greater than the first temperature and the second temperature. The fourth temperature may be greater than the first temperature and the second temperature. The fourth temperature may be greater than the third temperature. In certain aspects, all or a portion of the above temperature ranges may be overlapping.

In various aspects, the thermal barrier component 110 includes one or more components that provide multiple functions, thereby simplifying complexity and weight of the thermal barrier component and effectively suppressing the most critical reactions at different stages of a thermal runaway event. For example, the porous matrix may contain the functional material while achieving desired mechanical and flexibility perform and, when the porous matrix includes polymer foam, catalyze a reaction to form intumescent carbon. The synergistic reaction agent may be stable at high temperatures, have a high adsorbent capacity for water and/or fire retardant, and/or catalyze a reaction to form intumescent carbon. The binder may increase mechanical integrity of the porous matrix and retaining the functional material within the porous matrix and, when the binder is a polymer binder, catalyze a reaction to form intumescent carbon.

With reference to FIG. 2, in various aspects, the present disclosure provides a thermal barrier assembly 200 including one or more thermal barrier components 110. The thermal barrier assembly 200 may include one or more additional layers with or without functional materials. The thermal barrier component 110 and other layers may be sealed within an encapsulant 202. The encapsulant may include polyethylene terephthalate (PET) film, or any combination thereof.

In certain aspects, the thermal barrier assembly 200 includes one or more first layers 204. The first layer 204 may include urethane foam having an incorporated FR. The FR may be the same as or different than the FR in the thermal barrier component 110. The first layer 204 may be a single centrally-disposed layer. In certain aspects, the thermal barrier assembly 200 includes one or more second layers 206. The second layers may include a metal component, such as a metal plate. The metal plate may include an aluminum plate. Each of the second layers 206 may support a respective thermal barrier component 110. For example, each of the second layers 206 may be between the first layer 204 and a respective one of the thermal barrier components 110. The thermal barrier assembly 200 may include different or additional layers, such as aerogel layers optionally impregnated with functional materials, such as FR. In certain aspects, a thermal barrier assembly may include multiple adjacent thermal barrier components 110, with or without additional layers.

Example 1

Insulating properties of four thermal barrier components according to various aspects of the present disclosure compared. Each thermal barrier component includes a porous mat. With reference to FIG. 3A, a first thermal barrier component 300 includes ASPEN AEROGELS XTB aerogel. A second thermal barrier component 302 includes painted ASPEN AEROGELS XTB aerogel. A third thermal barrier component 304 includes painted fiber glass. A fourth thermal barrier component 306 includes a painted glass fiber mat including functional material and a binder. As used herein, "painted," refers to a side of the respective thermal barrier component being at least partially coated in a high-temperature paint that improves the emissivity of the material for infrared temperature detection.

Figure 3B:
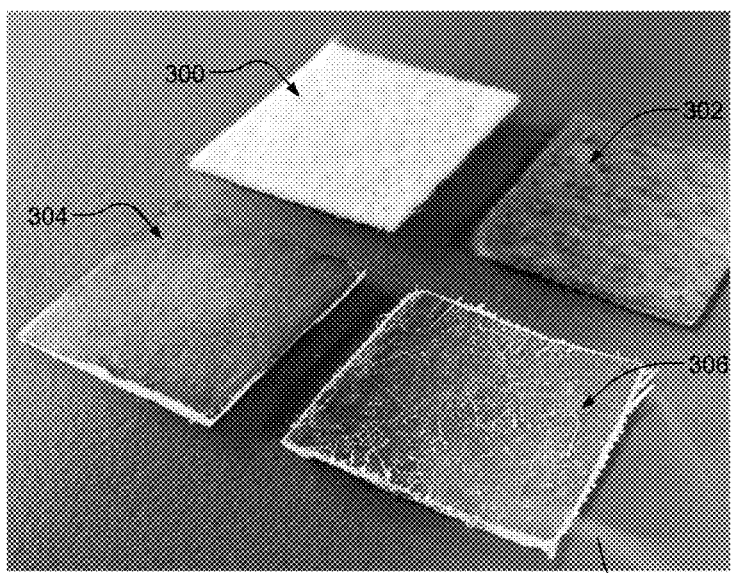
FIGS. 3A-3C relate to thermal barriers including porous mats functional materials according to various aspects of the present disclosure.
Figure 3A:
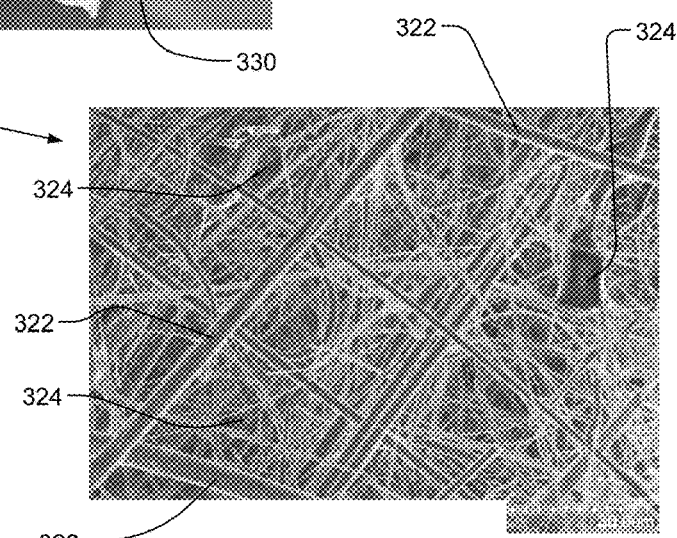

The fourth thermal barrier component 306 is prepared from a glass fiber mat 320, as shown in FIG. 3B. The glass fiber mat 320 includes a plurality of glass fibers 322 and defines a void space or plurality of pores 324. The void space 324 occupies about 90% of a volume of the glass mat 320 That is, the glass mat 320 has a porosity of about 90%.

The functional material includes a zeolite, a fire retardant, and a phase change material. The zeolite includes zeolite Y. The fire retardant includes $(NH_4)_3PO_4$. The phase change material includes pentaerythritol. The binder is a cellulose polymer binder including SOTERAS CCS-V and SOTERAS CCS-B. The fourth thermal barrier component 306 includes about 15 weight percent of the glass fibers, about 20 weight percent of the zeolite, about 15 weight percent of the fire retardant, about 30 weight percent of the phase change material, and about 20 weight percent of the binder. The functional material may further include a small amount of water in the zeolite and/or as residual moisture from preparation of the respective thermal barrier component.

The thermal barrier components 300, 302, 304, 306 are heated to a temperature of about 400° C. for about 20 seconds via a hot plate. The fourth mat 306 generates smoke 330 when heating, indicating release of the fire retardant. When used in an electrochemical cell, phosphor-containing radials from the fire retardant are capable of reacting with flammable gases released as the electrolyte is heated and decomposed, thereby suppressing fire spread.

Figure 3C:
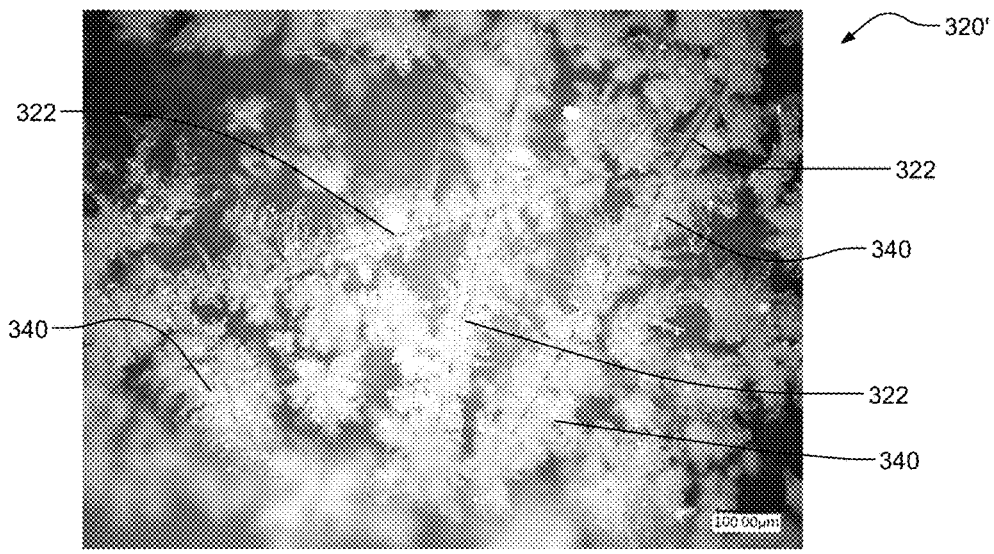

Referring to FIG. 3C, the fourth thermal barrier component 306' after heating and subsequently being cooled to room temperature (i.e., about 20° C.) is provided. The glass fibers 322 are at least partially coated with crystallized phase change material 340, demonstrating that the phase change material absorbs heat to change undergo phase change, and then crystallizes during solidification, as shown.

Example 2

Figure 4A:
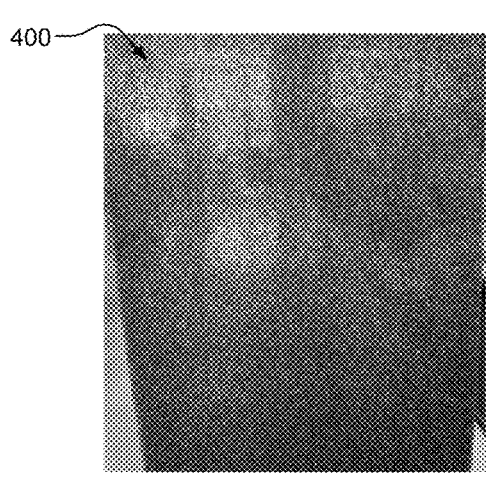
FIGS. 4A-4F relate to thermal barrier components including polyurethane mats according to various aspects of the present disclosure.

Referring to FIG. 4A, a polyurethane foam sheet 400 according to various aspects of the present disclosure is provided. The polyethylene foam sheet 400 is highly porous, having a porosity of greater than or equal to about 90%.

Figure 4B:
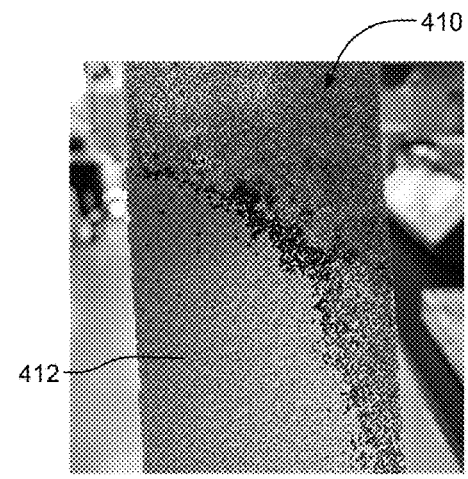

With reference to FIG. 4B, a partially-coated polyurethane sheet 410 according to various aspects of the present disclosure is provided. The partially-coated polyurethane sheet 410 includes the polyurethane foam sheet 400 and a functional material in a binder 412. The functional material includes a zeolite, a fire retardant, and a phase change material. The zeolite includes zeolite Y. The fire retardant includes $(NH_4)_3PO_4$. The phase change material includes pentaerythritol. The binder is a cellulose polymer binder including SOTERAS CCS-V and SOTERAS CCS-B. The functional material may further include a small amount of water in the zeolite and/or as residual moisture from preparation of the respective thermal barrier component.

Figure 4C:
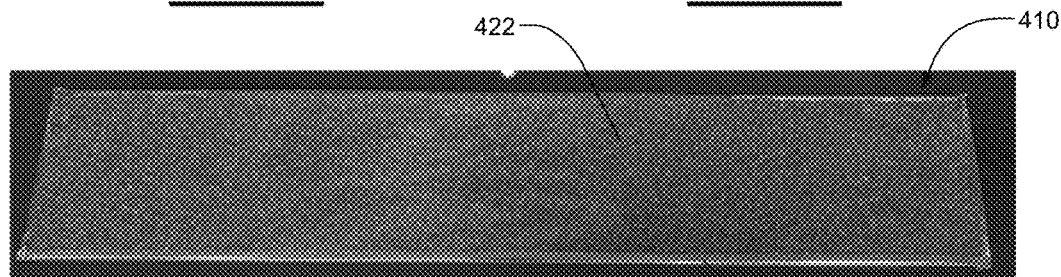
Figure 4D:
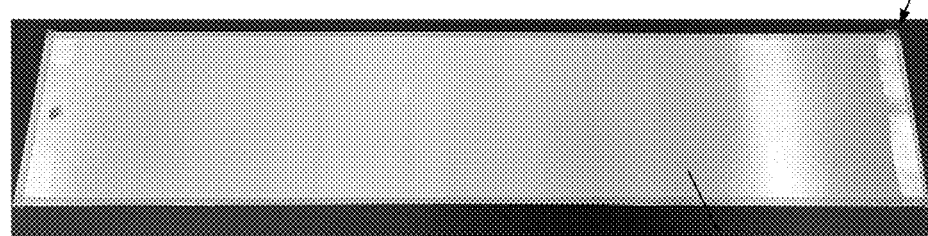

Referring to FIGS. 4C-4D a thermal barrier precursor 420 according to various aspects of the present disclosure is provided. The thermal barrier precursor 420 includes a polyurethane foam sheet 422 coupled to an aluminum plate 424.

Figure 4E:
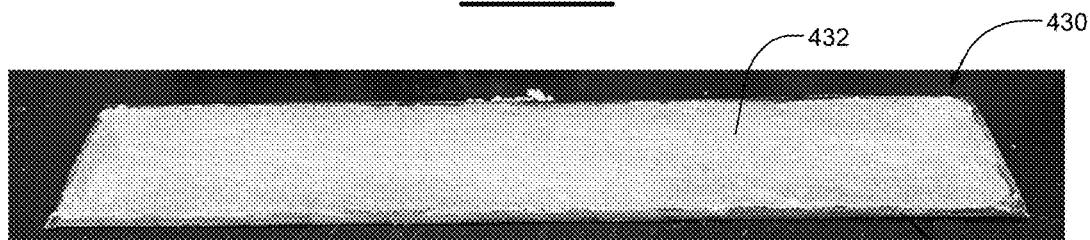

With reference to FIG. 4E, a thermal barrier component 430 according to various aspects of the present disclosure is provided. The thermal barrier component 430 includes the thermal barrier precursor 420 and a functional material in a binder 432, which is the same as the functional material and binder of FIG. 4B.

Figure 4F:

Referring to FIG. 4F, a sealed thermal barrier component 440 according to various aspects of the present disclosure is provided. The sealed thermal barrier component 440 includes the thermal barrier component 430 (FIG. 4E) inside of a pouch or encapsulant 442. The pouch 442 includes PET film.

Example 3

Four thermal barrier components according to various aspects of the present disclosure are prepared. Each thermal barrier component includes a porous mat. With reference to FIG. 5A, a first thermal barrier component 500 includes ASPEN AEROGELS XTB aerogel. A second thermal barrier component 502 includes a glass fiber mat. A third thermal barrier component 504 includes polyurethane foam with functional material and binder. A fourth thermal barrier component 506 includes a glass fiber mat with functional material and binder.

The functional material includes a zeolite, a fire retardant, and a phase change material. The zeolite includes zeolite Y. The fire retardant includes $(NH_4)_3PO_4$. The phase change material includes pentaerythritol. The binder is a cellulose polymer binder including SOTERAS CCS-V and SOTERAS CCS-B. The third and fourth thermal barrier components 504, 506 each include about 15 weight percent of the porous mat material (i.e., polyurethane or glass), about 20 weight percent of the zeolite, about 15 weight percent of the fire retardant, about 30 weight percent of the phase change material, and about 20 weight percent of the binder. The functional material may further include a small amount of water in the zeolite and/or as residual moisture from preparation of the respective thermal barrier component.

The thermal barrier components 500, 502, 504, 506 are prepared by wet-casting a slurry including the functional material and binder onto a single side of the respective porous mat. Vacuum infiltration is used to draw the slurry into pores. In certain aspects, the porous mat, such as the polyurethane foam, is squeezed to remove a portion of air from the pores and then released to draw the slurry into the pores. The slurry is dried.

Each of the thermal barrier components 500, 502, 504, 506 is placed into thermal contact with a heater plate 510. The thermal barrier components 500, 502, 504, 506 are retained on the heater plate 510 with tape 512. As will be described in greater detail below, the thermal barrier components 500, 502, 504, 506 are gradually heated from about 25° C. to about 350° C.

Figure 5B:
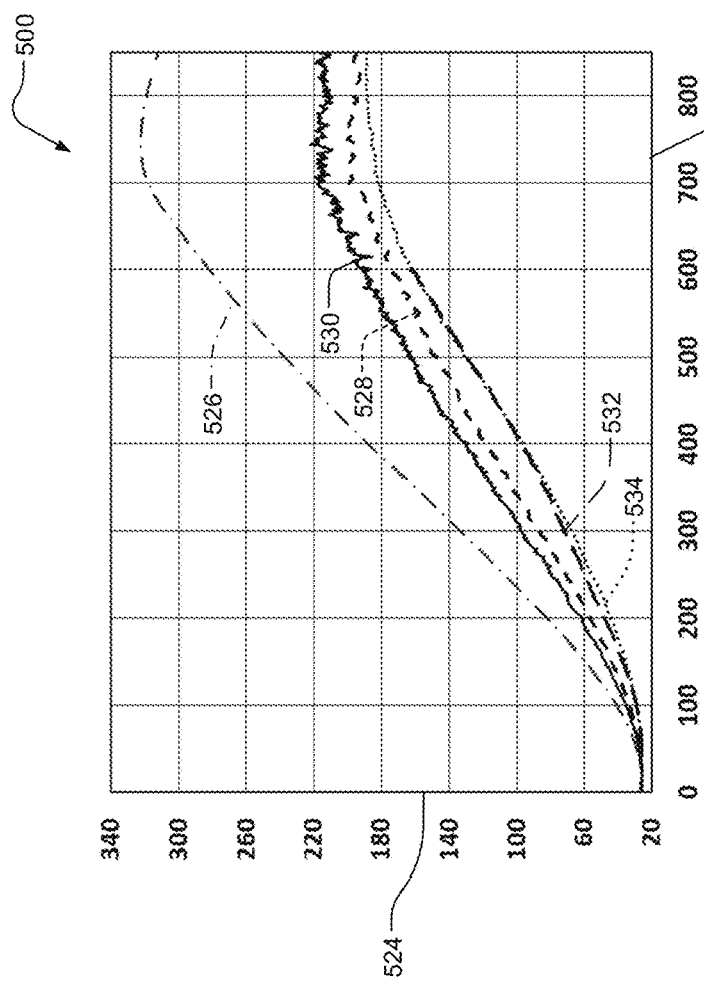
FIGS. 5A-5B relate to an example of gradually heating four different thermal barrier components according to various aspects of the present disclosure and observing rate of temperature increase.
Figure 5A:
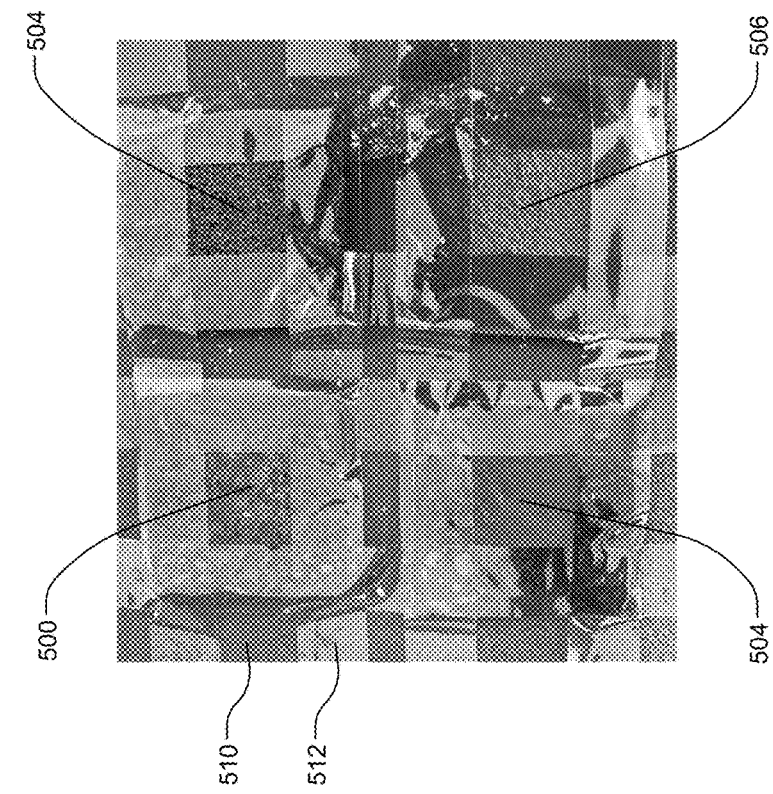

Referring to FIG. 5B, a graph 520 depicting temperature, as measured by an infrared temperature camera, as a function of time is provided. An x-axis 522 represents time in seconds. A y-axis 524 represents temperature in ° C. A first curve 526 illustrates heater plate temperature. A second curve 528 illustrates first thermal barrier component temperature. A third curve 530 illustrates second thermal barrier component temperature. A fourth curve 532 illustrates third thermal barrier component temperature. A fifth curve 534 illustrates fourth thermal barrier component temperature.

The fourth and fifth curves 532, 534 are partially overlapping, showing similar performance for the third and fourth thermal barrier components 504, 506 (FIG. 5A) within this temperature range with different mats or porous matrices. The fourth and fifth curves 532, 534 are about 20-30° C. lower than the second and third curves 528, 530 over most of the temperature range. This demonstrates increased thermal performance (i.e., slower heat transfer through thermal barrier component and reduced potential for TRP) through inclusion of the functional material in the third and fourth thermal barrier components 504, 506.

Accordingly, a thermal barrier component including the functional materials may have a temperature that is less than a thermal barrier component without the functional materials during heating from 25° C. to 350° C. over a time period of about 800 seconds. The temperature difference may be greater than or equal to about 5° C., optionally greater than or equal to about 10° C., greater than or equal to about 15° C., or greater than or equal to about 20° C.

Example 4

Figure 6A:
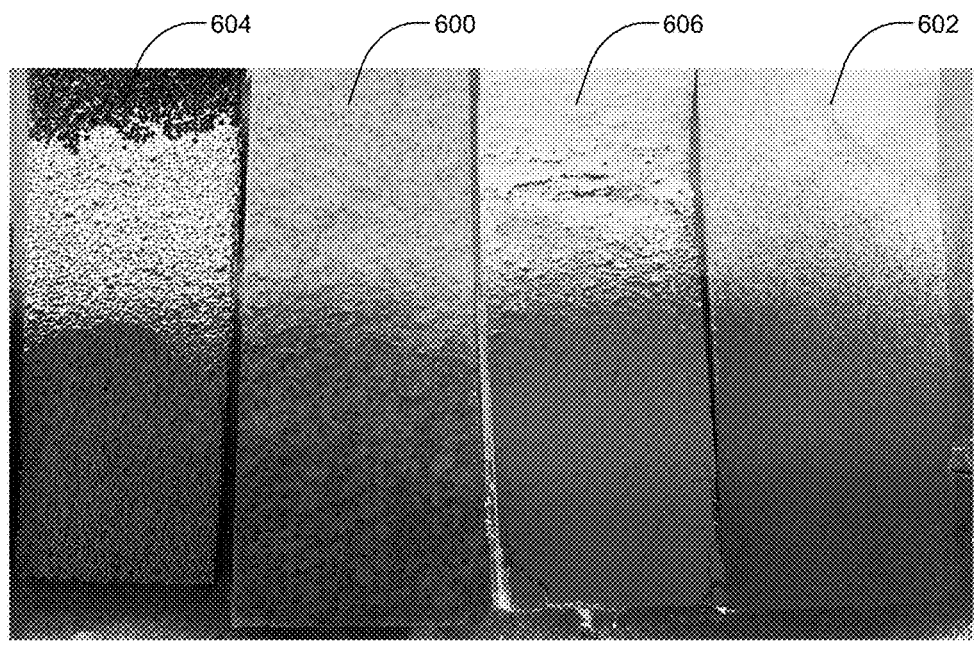

Four thermal barrier components are prepared. Each thermal barrier component includes a porous mat. With reference to FIG. 6A, a first thermal barrier component 600 includes ASPEN AEROGELS XTB aerogel. A second thermal barrier component 602 includes a glass fiber mat. A third thermal barrier component 604 includes polyurethane foam with functional material and binder. A fourth thermal barrier component 606 includes a glass fiber mat with functional material and binder.

The functional material includes a zeolite, a fire retardant, and a phase change material. The zeolite includes zeolite Y. The fire retardant includes $(NH_4)_3PO_4$. The phase change material includes pentaerythritol. The binder is a cellulose polymer binder including SOTERAS CCS-V and SOTERAS CCS-B. The third and fourth thermal barrier components 604, 606 each include about 15 weight percent of the porous mat material (i.e., polyurethane or glass), about 20 weight percent of the zeolite, about 15 weight percent of the fire retardant, about 30 weight percent of the phase change material, and about 20 weight percent of the binder. The functional material may further include a small amount of water in the zeolite and/or as residual moisture from preparation of the respective thermal barrier component.

The thermal barrier components 600, 602, 604, 606 are prepared by wet-casting a slurry including the functional material and binder onto a single side of the respective porous mat. Vacuum infiltration is used to draw the slurry into pores. In certain aspects, the porous mat, such as the polyurethane foam, is squeezed to remove a portion of air from the pores and then released to draw the slurry into the pores. The slurry is dried.

Figure 6B:
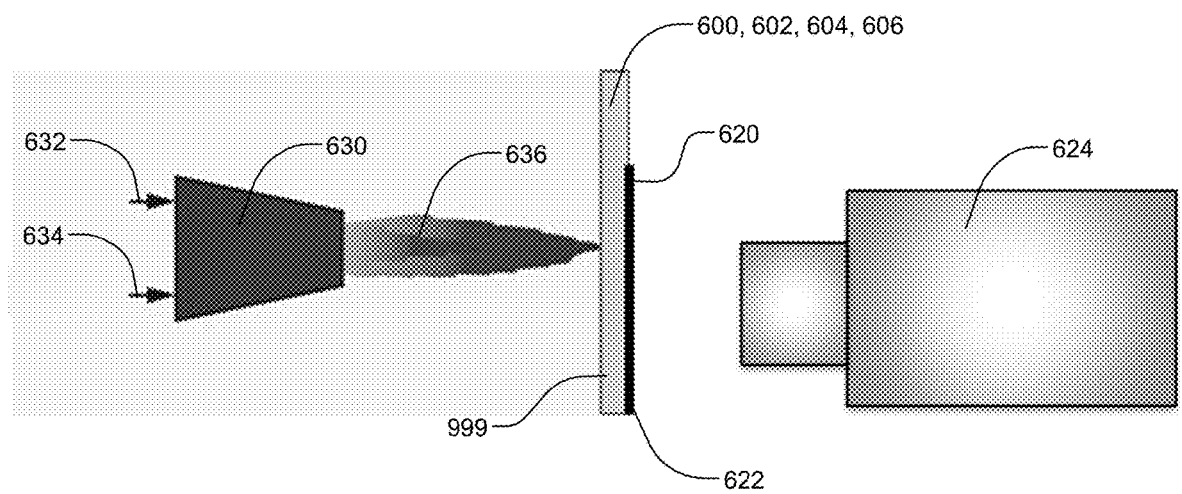

Each of the thermal barrier components 600, 602, 604, 606 is instantaneously heated with a flame to simulate thermal runaway. With reference to FIG. 6B, a schematic of an experimental setup is illustrated. Each of the thermal barrier components 600, 602, 604, 606 is painted on a first surface 620 with a high-heat paint 622. An infrared camera 624 is directed toward the high heat paint to detect a temperature of the first surface 620 of each of the thermal barrier components 600, 602, 604, 606. A burner 630 includes a fuel inlet 632 and a oxidant inlet 634. The burner generates a flame 636 having a temperature of greater than or equal to about 600° C. to less than or equal to about 1,300° C. The flame 636 is placed in direct thermal contact with a second side 640 of each of the thermal barrier components 600, 602, 604, 606.

With reference to FIG. 6C, a graph 650 depicting temperature as a function of time for the thermal barrier components 600, 602, 604, 606 is provided. An x-axis 652 represents time in seconds. A y-axis 654 represents average temperature in ° C. A first curve 656 illustrates temperature of the first thermal barrier component 600. A second curve 658 illustrates temperature of the second thermal barrier component 602. A third curve 660 illustrates temperature of the third thermal barrier component 604. A fourth curve 662 illustrates temperature of the fourth thermal barrier component 600. A portion 664 of the second curve 658 is flat at 370° C. because the infrared camera is saturated at 370° C.; however, it is expected that the temperature over the portion 664 exceeds 370° C.

The third and fourth curves 660, 662 are significantly lower than the first and second curves 656, 658, representing improved thermal runaway performance of the third and fourth thermal barrier components 604, 606 compared to the first and second thermal barrier components 600, 602. Over a time period of 60 seconds, the third and fourth thermal barrier components 604, 606 maintain temperatures of less than or equal to about 100° C., less than or equal to about 95° C., less than or equal to about 90° C., less than or equal to about 85° C., less than or equal to about 80° C., less than or equal to about 75° C., or less than or equal to about 70° C. The inclusion of the functional materials in the third and fourth thermal barrier components 604, 606 may facilitate reduced heat transfer and mitigate thermal runaway. In particular, the first and second thermal barrier components 600, 602 without the functional materials may have a temperature difference of greater than or equal to about 5° C. to less than or equal to about 320° C. compared to the third and fourth thermal barrier components 604, 606 having the functional materials between about 20 seconds and 50 seconds of exposure to the flame 636 (FIG. 6B).

Example 5

Figure 7B:
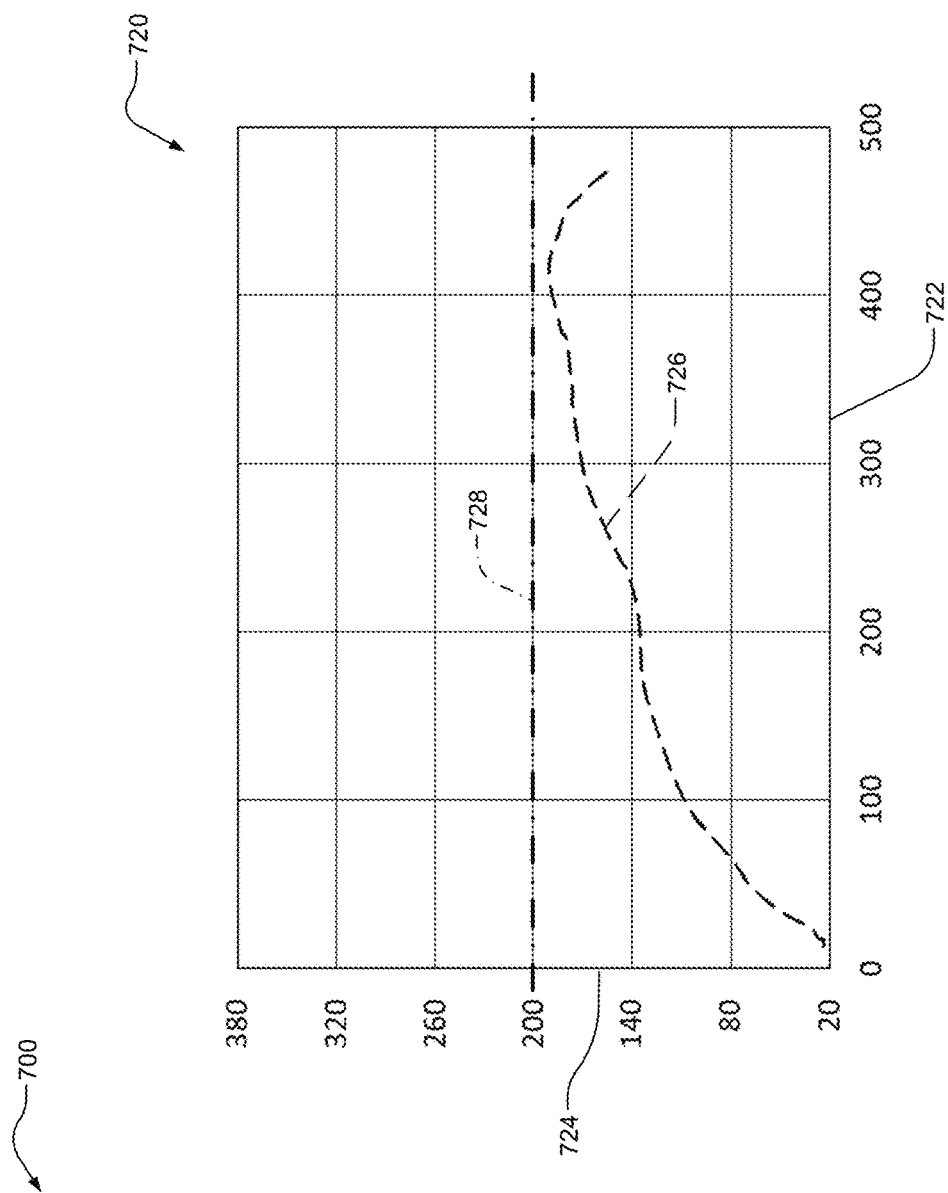
FIGS. 7A-7B relate to long time fire testing of a thermal barrier component according to various aspects of the present disclosure.
Figure 7A:
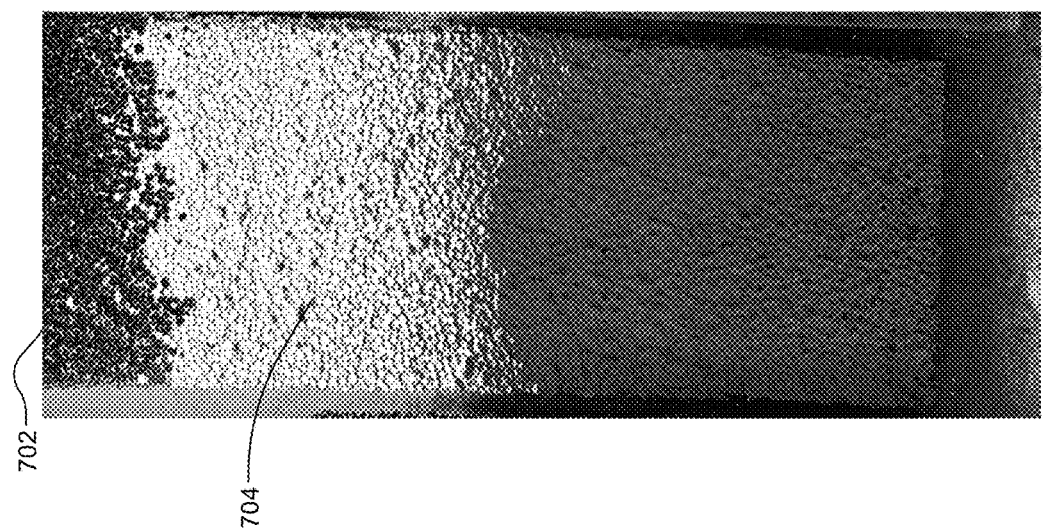

Referring to FIG. 7A, a thermal barrier component 700 includes polyurethane foam 702 with functional material and binder 704. The functional material includes a zeolite, a fire retardant, and a phase change material. The zeolite includes zeolite Y. The fire retardant includes $(NH_4)_3PO_4$. The phase change material includes pentaerythritol. The binder is a cellulose polymer binder including SOTERAS CCS-V and SOTERAS CCS-B. The thermal barrier component 700 includes about 15 weight percent of the polyurethane, about 20 weight percent of the zeolite, about 15 weight percent of the fire retardant, about 30 weight percent of the phase change material, and about 20 weight percent of the binder. The functional material may further include a small amount of water in the zeolite and/or as residual moisture from preparation of the respective thermal barrier component.

The thermal barrier component 700 is prepared by wet-casting a slurry including the functional material and binder onto a single side of the respective polyurethane foam 702. Vacuum infiltration is used to draw the slurry into pores. In certain aspects, the polyurethane foam is squeezed to remove a portion of air from the pores and then released to draw the slurry into the pores. The slurry is dried.

The thermal barrier component 700 is heated by a torch over a time period of about 7 minutes to simulate fire. A temperature within the polyurethane foam is measured by infrared camera. With reference to FIG. 7B, a graph 720 depicting temperature within the polyurethane foam 702 (FIG. 7A) is shown as a function of time. An x-axis 722 represents time in seconds. A y-axis represents highest temperature within the polyurethane foam in ° C. The curve 726 depicts the highest temperature within the polyurethane foam between about 0-450 seconds. Within the time period, the internal temperature of the polyurethane foam 702 (FIG. 7A) remains below 200° C., shown at 728, which is a typical triggering temperature for uncontrolled chemical reactions that can lead to thermal runaway. Accordingly, the thermal barrier component 700 (FIG. 7A) is configured to significantly suppress temperature rise.

Example 6

Three thermal barrier components are prepared. A first thermal barrier component includes functional material alone without a porous mat. A second thermal barrier component includes polyurethane foam with functional material and binder. A third thermal barrier component includes a glass fiber mat with functional material and binder.

The functional material includes a zeolite, a fire retardant, and a phase change material. The zeolite includes zeolite Y. The fire retardant includes $(NH_4)_3PO_4$. The phase change material includes pentaerythritol. The binder is a cellulose polymer binder including SOTERAS CCS-V and SOTERAS CCS-B. The second and third thermal barrier components each include about 15 weight percent of the porous mat material (i.e., polyurethane or glass), about 20 weight percent of the zeolite, about 15 weight percent of the fire retardant, about 30 weight percent of the phase change material, and about 20 weight percent of the binder. The functional material may further include a small amount of water in the zeolite and/or as residual moisture from preparation of the respective thermal barrier component. The first thermal barrier component further includes PET.

The second and third thermal barrier components are prepared by wet-casting a slurry including the functional material and binder onto a single side of the respective porous mat. Vacuum infiltration is used to draw the slurry into pores. In certain aspects, the porous mat, such as the polyurethane foam, is squeezed to remove a portion of air from the pores and then released to draw the slurry into the pores. The slurry is dried.

Figure 8:
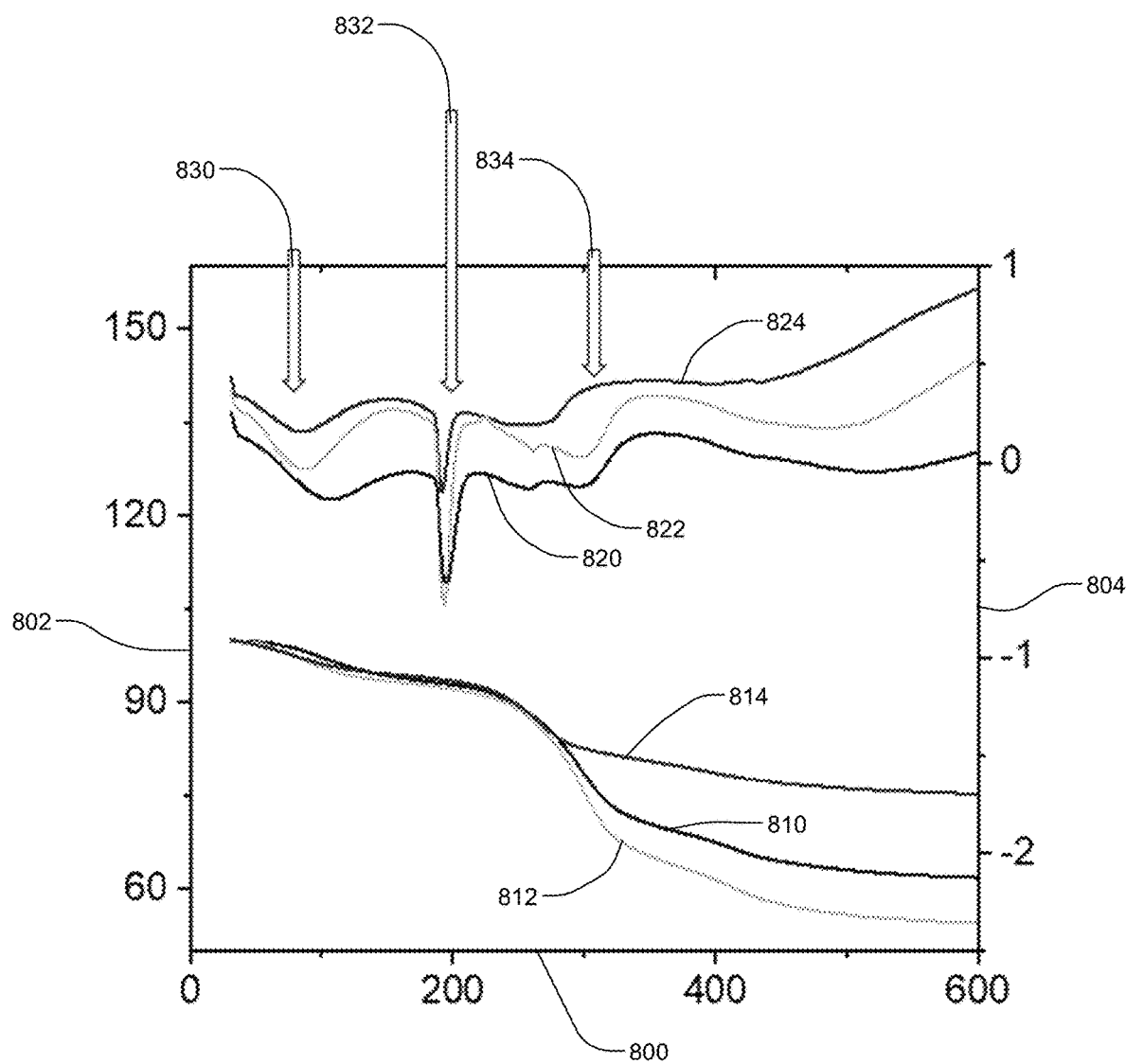
FIG. 8 is a graph illustrating weight percent and HF for three different thermal barrier components according to various aspects of the present disclosure as a function of temperature.

The thermal barrier components are heated to a temperature of about 600° C. over a time period of about 60 minutes. Temperature is detected via thermocouple. With reference to FIG. 8, an x-axis 800 represents temperature in ° C., a first y-axis 802 represents weight percent compared to an initial weight. Weight is measured via microbalance. A second y-axis 804 represents heat flow ("HF") in $Wg^{-1}$. HF is measured by calorimeter.

A first curve 810 illustrates weight percent of the first thermal barrier component as a function of temperature. A second curve 812 illustrates weight percent of the second thermal barrier component as a function of temperature. A third curve 814 illustrates weight percent of the third thermal barrier component as a function of temperature.

A fourth curve 820 illustrates HF of the first thermal barrier component as a function of temperature. A fifth curve 822 illustrates HF of the second thermal barrier component as a function of temperature. A sixth curve 824 illustrates HF of the third thermal barrier component as a function of temperature. Adsorbed moisture vaporization occurs at a first peak 830 of about 100° C. Phase transformation of the PCM occurs at a second peak 832 of just under 200° C. Release of FR begins at a temperature 834 of about 300° C.

A significant loss of mass occurs after the temperature due to the fire retardant transitioning to gas phase.

While the thermal barrier components, and thermal barrier assemblies, and battery packs provided by the present technology are particularly suitable for use in components of an automobile or other vehicles (e.g., motorcycles, boats, tractors, buses, motorcycles, trains, mobile homes, campers, and tanks), they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of limiting example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermal barrier component for an electrochemical cell comprising:
   a mat comprising,
   a porous matrix;
   a functional material in pores of the porous matrix, the functional material comprising an oxide; and
   a polymer binder in contact with the porous matrix and the functional material, at least one of the porous matrix, the functional material, and the polymer binder being configured to serve as an intumescent carbon source, the intumescent carbon source being present at greater than or equal to about 10 weight percent to less than or equal to about 30 weight percent, wherein the oxide is configured to catalyze thermal degradation of the intumescent carbon source to form intumescent carbon at a first temperature of greater than or equal to about 300° C.

2. The thermal barrier component of claim 1, wherein the functional material further comprises a phase change material.

3. The thermal barrier component of claim 2, wherein
   the phase change material includes at least one of (i) a solid-solid phase change material selected from the group consisting of: pentaerythritol, pentaglycerine, neopentyl-glycol, high-density polyethylene, a layered porovskite, or any combination thereof, or (ii) a solid-liquid phase change material selected from the group consisting of: sodium sulfate decahydrate, calcium chloride hexahydrate, magnesium chloride hexahydrate, calcium chloride-calcium bromide hexahydrate, magnesium nitrate hexahydrate, magnesium chloride-magnesium nitrate hexahydrate, or any combination thereof, and
   the phase change material is present in the thermal barrier component in an amount ranging of greater than or equal to about 20 weight percent to less than or equal to about 40 weight percent.

4. The thermal barrier component of claim 2, wherein the phase change material is configured to serve as the intumescent carbon source.

5. The thermal barrier component of claim 2, wherein the phase change material is configured to undergo endothermic phase change at a second temperature of greater than or equal to about 100° C. to less than or equal to about 250° C.

6. The thermal barrier component of claim 1, wherein the porous matrix comprises glass fibers, carbon fibers, or a polymer foam.

7. The thermal barrier component of claim 6, wherein
   the porous matrix comprises the polymer foam, and
   the polymer foam is configured to serve as the intumescent carbon source.

8. The thermal barrier component of claim 7, wherein the intumescent carbon source comprises polyurethane.

9. The thermal barrier component of claim 1, wherein the porous matrix defines a porosity of greater than or equal to about 90%.

10. The thermal barrier component of claim 1, wherein the functional material further comprises a fire retardant.

11. The thermal barrier component of claim 10, wherein
    the functional material comprises a plurality of particles including the oxide, and
    at least a portion of the fire retardant is adsorbed on at least a portion of the plurality of particles.

12. The thermal barrier component of claim 11, wherein the oxide is configured to release the fire retardant at a second temperature of greater than or equal to about 300° C. to less than or equal to about 900° C.

13. The thermal barrier component of claim 10, wherein
    the fire retardant is selected from the group consisting of: a phosphate-based fire retardant, a carbonate-based fire retardant, a nitrate-based fire retardant, hydroxide-based fire retardant, a chloride-based fire retardant, or any combination thereof, and
    the fire retardant is present in the thermal barrier component in an amount greater than or equal to about 5 weight percent to less than or equal to about 25 weight percent.

14. The thermal barrier component of claim 1, wherein functional material includes a zeolite, the zeolite including the oxide.

15. The thermal barrier component of claim 1, wherein the oxide is selected from the group consisting of: $SiO_2$, $Al_2O_3$, $ZrO_2$, $TiO_2$, CaO, $V_2O_5$, MgO, or any combination thereof.

16. The thermal barrier component of claim 1, wherein the oxide is present in the thermal barrier component an amount ranging of greater than or equal to about 10 weight percent to less than or equal to about 30 weight percent.

17. The thermal barrier component of claim 1, wherein the functional material includes,
    a plurality of particles including the oxide, and
    water adsorbed on the plurality of particles, the water being configured to be released from the plurality of particles at a second temperature of greater than or equal to about 100° C.

18. The thermal barrier component of claim 1, wherein the mat defines a compressibility of greater than or equal to about 10%.

19. A thermal barrier component for an electrochemical cell comprising:
    a mat including,
    a porous matrix; and
    a functional material in pores of the porous matrix, the functional material comprising,
    a plurality of particles including a zeolite,
    water adsorbed on the plurality of particles, the water being configured to be released from the plurality of particles at a first temperature of greater than or equal to about 100° C., a fire retardant adsorbed on the plurality of particles, the fire retardant being configured to be released from the plurality of particles at a second temperature greater than or equal to about 300° C. to less than or equal to about 900° C., and a phase change material configured to undergo endothermic phase change at a third temperature of greater than or equal to about 100° C. to less than or equal to about 250° C., the phase change material is a solid-liquid phase change material, a solid-solid phase change material, or both a solid-liquid phase change material and a solid-solid phase change material, and the phase change material is present at greater than or equal to about 20 weight percent to less than or equal to about 40 weight percent.

20. The thermal barrier component of claim 19, wherein the porous matrix comprises glass fibers, carbon fibers, or a polymer foam.

\* \* \* \* \*